Dec. 23, 1941.  S. C. MOON  2,267,663
HYDRAULIC CONTROL VALVE AND SYSTEM
Filed June 11, 1940   3 Sheets-Sheet 1
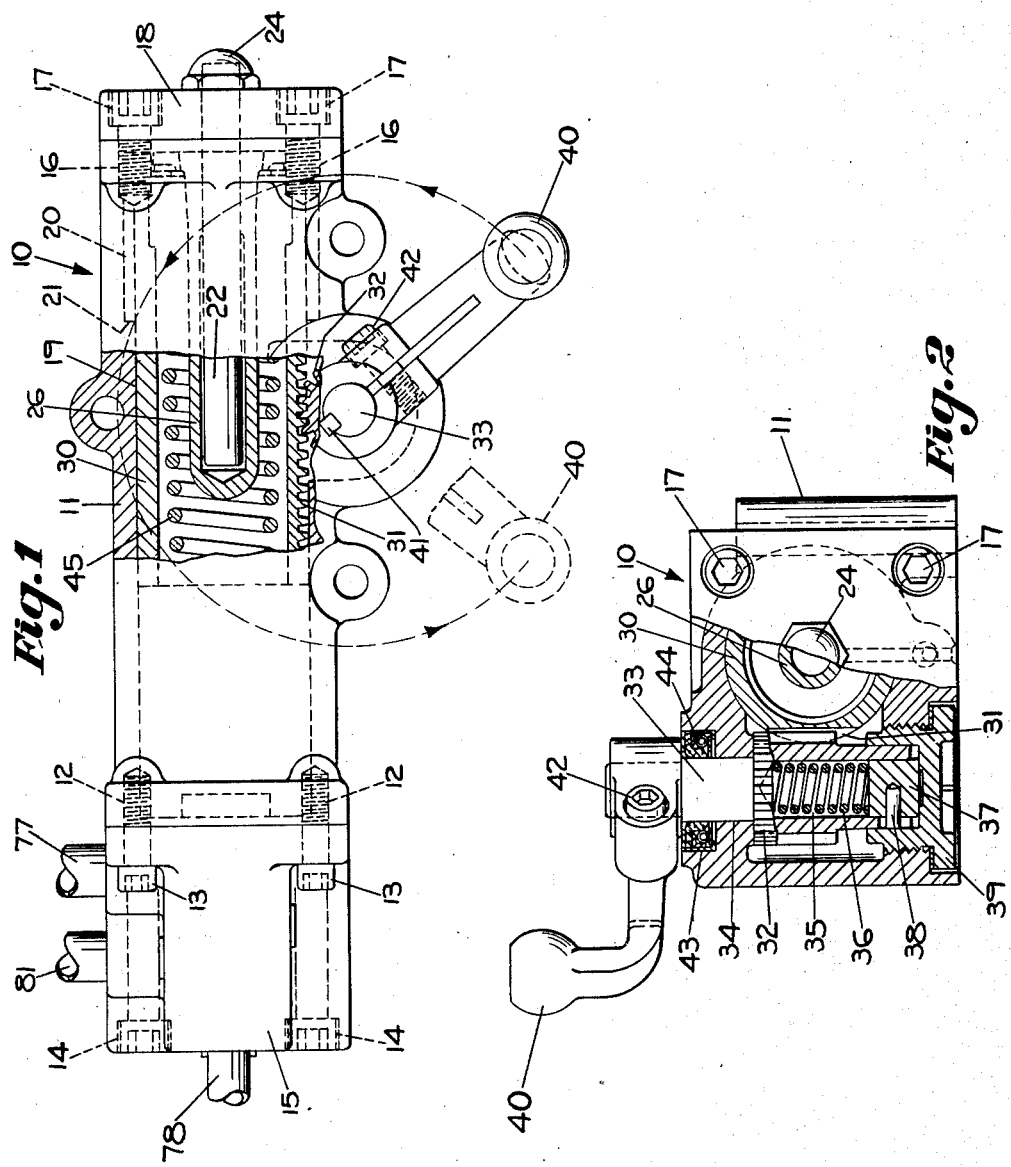
INVENTOR:
STERLING C. MOON,
By Chas. M. Nissen,
ATTY.

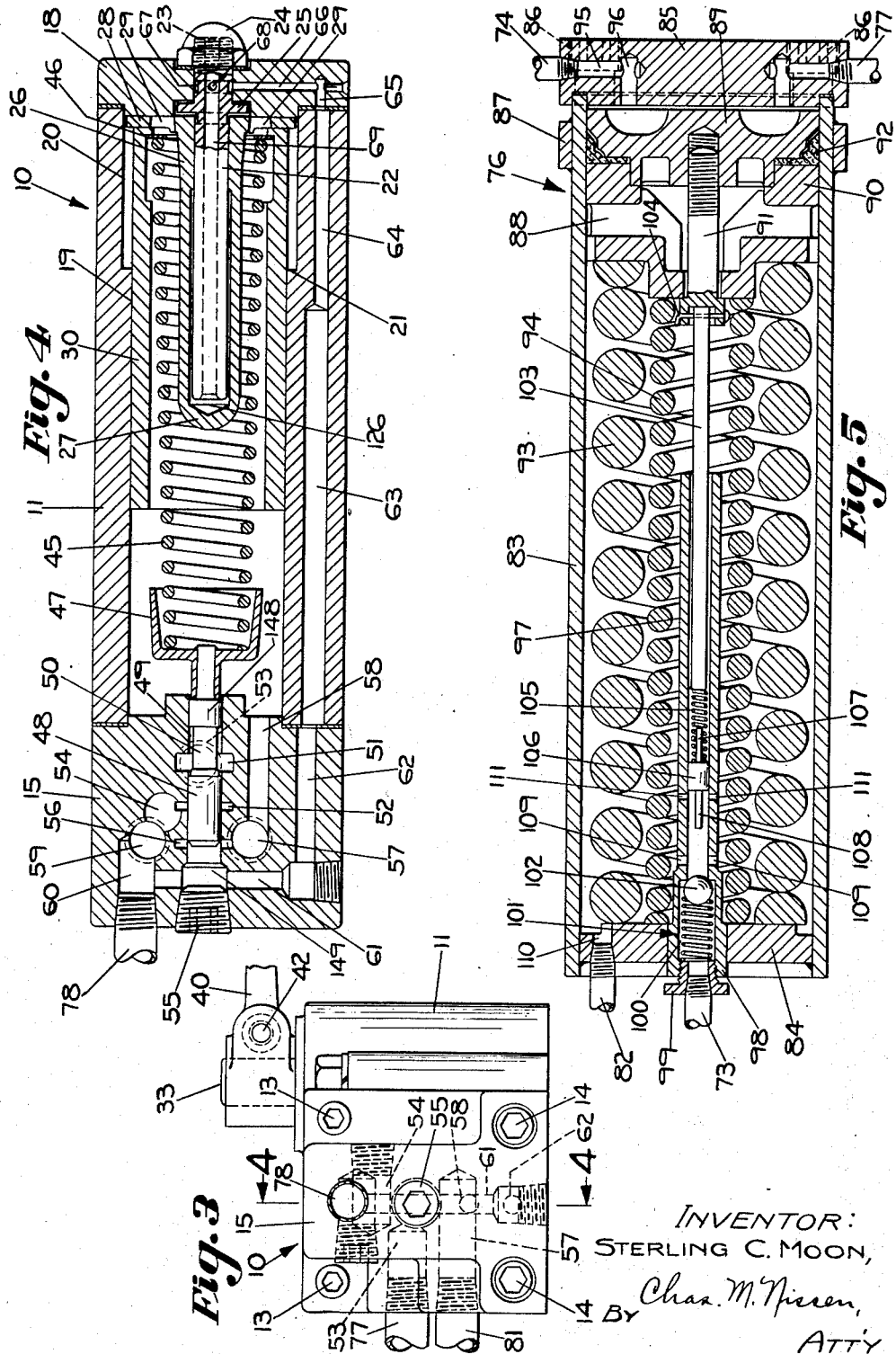

Dec. 23, 1941.  S. C. MOON  2,267,663
HYDRAULIC CONTROL VALVE AND SYSTEM
Filed June 11, 1940   3 Sheets-Sheet 3
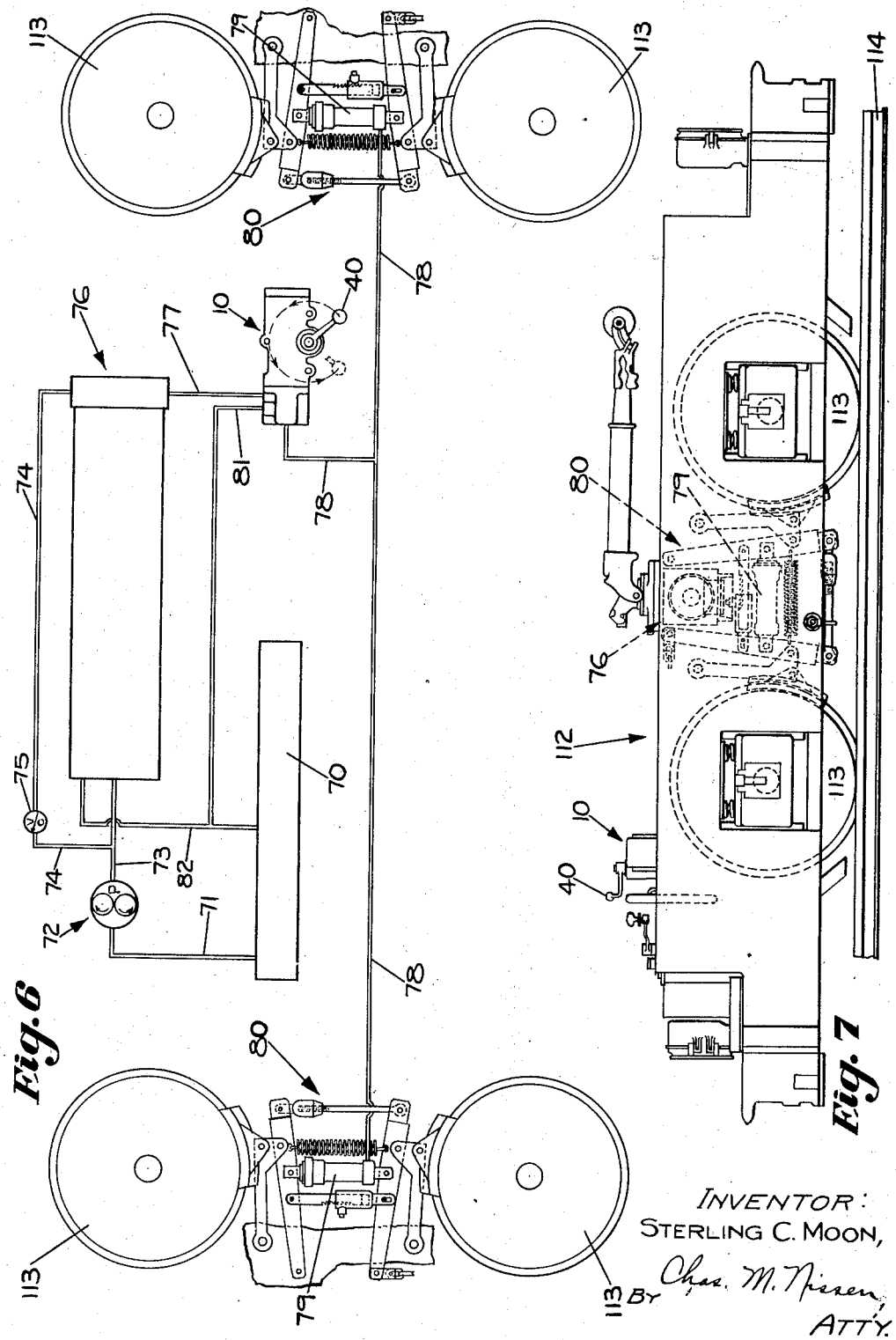
INVENTOR:
STERLING C. MOON,
By Chas. M. Nissen
ATTY.

Patented Dec. 23, 1941

2,267,663

UNITED STATES PATENT OFFICE 2,267,663

HYDRAULIC CONTROL VALVE AND SYSTEM

Sterling C. Moon, Worthington, Ohio, assignor to The Jeffrey Manufacturing Company, a corporation of Ohio Application June 11, 1940, Serial No. 339,919

12 Claims. (Cl. 303—54)

This invention relates to a hydraulic control valve particularly adapted to control the hydraulic braking system of a heavy vehicle, such as a mine locomotive, a truck, tractor or any other similar device or any hydraulic system in which a variable pressure is required, and to an improved braking system.

An object of the invention is to provide a hydraulic control valve which is a combination of a balanced valve and an unbalanced valve, or may be made either entirely balanced or unbalanced.

Another object of the invention is to provide a control valve which includes therein a pressure reducing valve.

Another object of the invention is to provide an improved reducing valve.

Another object of the invention is to provide a hydraulic control valve in which the pressure control piston also acts automatically as a pressure reducing valve, thus affording a saving of an extra unit and also simplifying the hydraulic system in which the control valve is the controlling factor.

Another object of the invention is to provide an improved hydraulic braking system.

Other objects of the invention will appear hereinafter, the novel features and combinations being set forth in the appended claims.

In the accompanying drawings,

Fig. 1 is a plan view of the hydraulic control valve of my invention with parts broken away to more clearly show other parts;

Fig. 2 is an end elevational view of the control valve with parts broken away to show more clearly other parts;

Fig. 3 is an end elevational view of the opposite end of that illustrated in Fig. 2;

Fig. 4 is a longitudinal sectional view taken on the line 4—4 of Fig. 3, looking in direction of the arrows;

Fig. 5 is a longitudinal sectional view of a hydraulic pressure accumulator;

Fig. 6 is a schematic piping diagram of a braking system comprising my invention including the valve of my invention; and Fig. 7 is a side elevational view of a mine locomotive equipped with a hydraulic braking system of my invention.

Referring to Figs. 1, 3 and 4 of the drawings, the control valve 10 consists of a body portion 11, one end of which is provided with tapped holes 12 for receiving the bolts 13 and 14 which bolts secure the valve piston block 15 in its assembled relation with said body portion. The opposite end of the body portion 11 is provided with tapped holes 16 and bolts 17 for assembling the valve closing plate and piston support 18 in its proper relation with the said body portion.

The body portion 11 is provided with a longitudinal bore 19 and counterbore 20, the conflux of which forms an annular shoulder or abutment 21, the purpose of which will be hereinafter explained.

To the closing plate or piston support 18 is detachably mounted a fixed piston 22 concentrically aligned with the longitudinal bore 19 of the body portion of the valve. The threaded end 23 of the piston 22 projects thru a bore in the support plate 18 and is threadedly fit with a cap nut 24 and together with a peripheral flange 25 spaced from the threaded end of the piston 22 form a clamp for detachably fixing the piston to its supporting plate 18. Mounted for reciprocating movement on the piston 22 is a balancing cylinder 26 having one end bored to fit closely the said piston 22 and the opposite end closed as at 27. The bored end of the cylinder 26 is provided with a peripheral flange 28 of a diameter to permit free longitudinal movement in the counterbore 20 only to the extent of the annular abutment 21 of the body portion 11. Apertures 29 in the flange 28 permit free communication of hydraulic fluid to either side of said flange.

A rack sleeve 30 is reciprocally mounted in the longitudinal bore 19 and is provided with rack teeth 31 (Fig. 1) which mesh with a pinion 32 integral with a vertical shaft 33, an upper portion of which is journaled in a bearing 34 formed in the upper part of the body 11. The lower end of the shaft 33 has a bore 35 provided with a spring 36 and a retarding block 37 free to move along the axis of bore 35 and fixed by the pin 38 to rotate with the shaft 33, the said lower end of which is journaled in a removable bearing lug 39 threaded into the lower part of body portion 11. To the upper end of the shaft 33 is removably fixed the operating handle 40, fixed thereto by the key 41 and clamping screw 42. In a recess 43 in the upper face of the body 11 concentric with shaft 33 is mounted an oil seal 44.

A conical spring 45 is mounted in the sleeve 30, one end being seated against a retaining ring 46 abutting a shoulder in said sleeve, the other end being seated in a spring cup 47 rigidly fixed to one end of a valve regulating piston 48. The piston 48 is positioned in a central longitudinal bore 49 through the valve block 15 and has a pressure sealing sliding fit therewith. A necked or reduced portion 50 of the piston 48 is of a length to permit communication between longitudinally spaced annular recesses 51 and 52 concentric with the bore 49, which recesses are in communication with the pressure ports 53 and 54, respectively.

The outer end of bore 49 is counterbored, as at 149, and threadedly receives pipe plug 55. Another annular recess 56 concentric with the bore 49 and spaced longitudinally from the recess 52 is in communication with a drain port 57 which connects to a supply tank 70 (Fig. 6) by means of the pipes 81, 82. Drain port 57 is in communication with bore 19 by means of passageway 58 to open the interior of the valve body to drain. The pressure port 54 thru the bores 59 and 60 and the passageways 61, 62 in the piston block 15, the passageways 63, 64 in the body portion 11, also passageways 65, 66 in the closing plate 18 and the peripheral recess 67, drill hole 68 and passageway 69 in the piston 22 communicates with the balancing cylinder 26 as shown in Fig. 4.

Attention is now directed to Fig. 6 of the drawings, which discloses schematically a hydraulic braking system of which the hydraulic control valve 10 is a part. The hydraulic braking system comprises an oil or hydraulic fluid supply tank or reservoir 70 from which a pump 72 derives its supply of fluid through pipe 71 and delivers it through pipes 73, 74 and check valve 75 to the righthand end of a high pressure accumulator 76.

The pipe 73 from the pump 72 also leads to the lefthand end of accumulator 76. The check valve 75 permits the fluid to flow therethrough towards the right but prevents reverse flow therethrough towards the left, thereby preventing any pressure built up in the accumulator 76 from escaping back through the pump. The pipe 77 leads from the accumulator 76 to the hydraulic control valve 10, and another pipe 78 leads from the valve 10, branches and connects to a hydraulic jack 79 in each brake mechanism 80. The drain or return pipe 81 leads from valve 10 and joins to a pipe 82 leading from the lefthand end of accumulator 76 to the reservoir 70.

In Fig. 5 of the drawings is shown a longitudinal section of the accumulator 76 comprising a cylinder 83 which forms a housing having its rear end closed by an internal head 84 which is preferably welded at its periphery to the interior wall of said cylinder. Cylinder 83 also carries a head plate 85 at its head end which is removably clamped thereto by four corner clamping screws 86 which thread into threaded apertures in a square plate 87 welded to the exterior of said cylinder adjacent the head end thereof.

Within the cylinder 83 is a movable piston 88 formed by two parts 89 and 90 which are removably clamped together by a bolt 91. Between the parts 89 and 90 of piston 88 there is a leak-proof cup washer 92 formed of composition material.

Between the lefthand face of the piston 88 and the rear head 84 is a large helical compression spring 93 within which is a smaller helical compression spring 94 which is oppositely coiled. The two springs 93 and 94 urge the piston 88 toward the right as evidenced by Fig. 5 of the drawings.

The hydraulic fluid delivered from the pump 72 normally flows by way of pipe 74 to the passageways 95 and 96 in head plate 85 and into the interior of cylinder 83, between the piston 88 and said head plate. This hydraulic fluid is generally fed at a relatively high but variable pressure which is effective in forcing the piston 88 to the left against the action of springs 93 and 94 consequently storing said fluid in the reservoir formed between head plate 85 and piston 88 within the cylinder 83 and under the pressure of said springs, as an illustration the hydraulic fluid may be under a maximum pressure of nine hundred pounds per square inch when the accumulator is full and is available to the control valve 10 for regulating said pressure to the hydraulic jacks 79 in the hydraulic brake system at any time whether the pump 72 is operating or not.

Whenever a predetermined amount of fluid has been stored under pressure in the accumulator 76 and the springs 93 and 94 are compressed almost to a solid condition, for example, within one-sixteenth inch of solid compression, and thus to a maximum pressure, a mechanism is provided within the accumulator 76 to form a substantially no-load by-pass for the pump 72. This by-pass mechanism comprises an elongated cylinder 97 positioned longitudinally and centrally of the cylinder 83 and rigidly fixed in head 84 thereof, as by welding. A head or enlargement 98 on the fixed end of elongated cylinder 97 projects through the cylinder head 84 and is internally threaded in its end to couple with pipe 73 by means of a fitting 99. The enlargement 98 has a chamber 100 formed therein, housing a spring-pressed check valve 101 which is normally closed due to the spring pressure on the ball 102 but more forcibly closed due to the hydraulic fluid pressure through pipe 73 from the pump 72. However, when a predetermined amount of fluid has been stored, the piston 88 has moved to a predetermined position, thereby positively opening the check valve 101 by means of mechanism comprising a rod 103 which is loosely attached by a pin 104 to the head of bolt 91 and which extends into the cylinder 97 and abuts an end of a coil spring 105, the other end of which coil spring abuts a floating piston 106 within the cylinder 97.

The piston 106 carries oppositely extending projections 107 and 108. The coil spring of check valve 101 is rather weak relative to the spring 105; but the check valve 101 will not be opened by the pressure of spring 105 when the projection 108 is first moved into contact with the ball 102 of said check valve by reason of the high pressure hydraulic fluid against the opposite side of said ball but immediately the spring 105 has been compressed sufficiently to permit a solid contact between rod 103, piston 106 and its projections 107 and 108, and ball 102, any further movement of said rod will dislodge the ball 102 from its seat, thereby breaking the seal of said check valve and causing an appreciable drop in the high fluid pressure against said ball 102, thereby permitting the spring 105 to act very rapidly in opening the check valve 101.

Such opening of the check valve 101 permits hydraulic fluid to flow into the cylinder 97 from which it can freely flow by means of ports 109 into the cylinder 83 to the left of the piston 88. There will be no pressure created in the cylinder 83 to the left of piston 88 because the head 84 is provided with a drain port 110 connected by pipe 82 to the supply tank or reservoir 70. After the check valve 101 has been opened and so long as the accumulator 76 is substantially full of hydraulic fluid under high pressure, the aforedescribed no-load by-pass for the pump 72 will be provided and in fact the piston 88, subsequent to opening the check valve 101 can move to the right, for an appreciable distance before the no-load by-pass for the pump 72 is shut off. Upon withdrawal of any fluid from the high pressure side of the accumulator 76 while the above-mentioned no-load by-pass is effected as afore-described, the piston 88 will, of course, move to the right with a similar movement of the rod 103 thereby lessening the tension of spring 105 and upon withdrawal of sufficient fluid the tension of spring 105 will be overcome by the pressure of the check valve spring, combined with the hydraulic fluid pressure entering thru the pipe 73 and thereby closing the check valve 101. Once check valve 101 is closed the no-load by-pass for pump 72 is shut off and the output of said pump is required to be fed through check valve 75 and pipe 74 to the storage or high pressure side of accumulator 76.

It may additionally be pointed out that the cylinder 97 carries ports 111 which are for the purpose of preventing any hydraulic lock in said cylinder between the end of rod 103 and piston 106 when the projection 108 contacts the ball 102 of check valve 101. That is the rod 103 may act as a piston in the cylinder 97 and ports 111 permit release of any pressure accumulated therein after the piston 106 has moved to the left of said ports.

It is thus evident that the accumulator 76 operates automatically to accumulate a predetermined amount of hydraulic fluid under high pressure between the piston 88 and the head plate 85 and provides a no-load by-pass for the pump 72 whenever this predetermined amount of fluid under high pressure is accumulated and automatically removes the no-load by-pass from the pump 72 whenever the volume of accumulated hydraulic fluid is reduced to a predetermined amount.

It is further evident that this hydraulic fluid under high pressure is available to the control valve 10 for operating the brake mechanisms 80 for a period of time after the pump 72 has ceased functioning.

The function of the control valve 10 will now be more thoroughly explained.

Referring to the drawings, Fig. 4 shows a longitudinal section in elevation with the operating parts in the off position. As the operating lever 40 is rotated in a counter-clockwise direction, the toothed sleeve 30, by reason of rack teeth 31 and pinion 32, moves to the left against the action of spring 45 and when said spring is compressed the control piston 48 will be moved to the left permitting communication of high pressure fluid from the accumulator 76 through pipe 77 to port 53 in valve piston block 15 and through recess 51, bore 49, recess 52, port 54, bores 59, 60 and pipe 78 to hydraulic jacks 79 of brake mechanisms 80 and also through passageways 61, 62, 63, 64, 65, 66 to annular recess 67 through hole 68 and passageway 69 in the fixed piston 22 to the chamber 126 in the balance cylinder 26. As the pressure in chamber 149 increases piston 48 moves to the right to cut off the flow of fluid. When a condition of equilibrium is reached the pressure is equal at each end of control piston 48, that is in chamber 126 at one end and in counterbore 149 at the opposite end, thereby balancing the piston 48. This balanced pressure will prevail and maintain the position of the operating lever 40 in any position to which it is adjusted through the normal operating range from zero to any predetermined amount such as four-hundred pounds pressure, or until the flange 28 of balancing cylinder 26 contacts the abutment 21. Should more than normal pressure be required to set and hold the brakes, the operating lever 40 may be further rotated counter-clockwise to supply any of the remaining pressure of the total available.

To release the brakes or reduce the braking action lever 40 is moved in a clockwise direction which reduces the effective force of spring 45 on piston 48. Consequently piston 48 will move to the right to provide communication between counterbore 149 and drain port 57 which will permit hydraulic fluid to escape from the pipe 78 until the pressure therein is reduced to the valve as determined by the position of lever 40 whereupon piston 48 will again move to the left and close this communication establishing a condition of equilibrium again. Of course, when the lever 40 is in the full off positions the parts of valve 10 are as illustrated in Fig. 4 and pipe or line 78 is connected directly to drain and the brakes are fully released.

Practically no effort is required to rotate the lever 40 through the normal range of operation, that is until the flange 28 contacts the abutment 21 or in other words through the balanced pressure range. But the further rotation of lever 40 in a counter-clockwise direction will cause the sleeve 30 and therefore spring 45 and cup 47 on the end of piston 48 to leave the balancing agent or flange 28 of balancing cylinder 26 and move to the left until sleeve 30 comes in contact with the inner face of piston block 15, this further rotation of lever 40 will require an effort of the operator, which in one device is from twelve to seventeen pounds. Upon release of the lever 40 when in its full on position the spring 45 will cause the sleeve 30 to settle back to the right until it contacts the balance cylinder flange 28 and here the brake remains set at the predetermined pressure so long as the position of the lever is unchanged. To release the pressure on the brakes the lever 40 is moved to its off position, thereby moving the sleeve 30 and the balance cylinder 26 to the extreme right end of the valve portion 11 against the closing plate 18.

The combination balanced and unbalanced control valve produces a safety feature in that the operator will be unable unintentionally to put all of the available hydraulic pressure into effect without some manual effort and thereby lock the brakes to the wheels thus lowering the efficiency of the braking system by sliding the wheels along the rails.

The suggested four-hundred pounds maximum pressure of the normal or balanced pressure range is sufficient in one practical case for normal operation of the brakes and this can be applied without undue effort but any greater hydraulic pressure applied must follow a manual effort against the action of the spring 45 and therefore cannot be done unintentionally.

In some hydraulic systems it may be preferable for the control valve to be balanced through their entire operating ranges, in such cases the peripheral flanges 28 of the balancing cylinders 26 may be made with their diameters not to exceed the diameters of the sleeves 30, or the sleeves 30 and the balancing cylinders 26 may be made integral and by omitting the counterbores 20 in the body portions 11 it will be seen by reference to the drawings that valves thus made would be balanced entirely through their operating ranges.

When a control valve is operating in a balanced condition, any setting of the handle 40 for a specific pressure will be preserved by virtue of said balance.

In another hydraulic system it may be preferable to omit the balanced feature from the control valve and thereby require a manual effort against the action of spring 45 through the entire operating range, in such a case the fixed piston 22, the bore therefor in closing plate 18, cap nut 24, balancing cylinder 26 and the pressure passageways leading from counterbore 149 to said balancing cylinder 26 would be omitted.

A particular feature in the control valve 10 is the inclusion of a pressure reducing feature which automatically acts whenever the pressure exceeds that of any specific adjustment or setting of said control valve. That is, should the control valve be set at any point in the operating range and the hydraulic pressure permitted by such setting be augmented by pressure produced by eccentric wheels or by any other means, such additional pressure will automatically act on the left hand end of control piston 48 (as viewed in Figs. 1 and 4), compressing the spring 45 thus permitting movement of said piston toward the right to establish communication between the annular recess 56 in the drain side of the hydraulic system and the counterbore 149 in the pressure side of said system thereby reducing the pressure to normal for the particular setting of said control valve.

In Fig. 7 of the drawings will be seen in elevation a mine locomotive 112 equipped with a hydraulic braking system herein described which includes my invention and is shown in Fig. 6, which locomotive also is equipped with track wheels 113 for traversing a pair of rails, one of which is shown at 114.

By reference to Fig. 2 of the drawings, it will be seen that the shaft 33 extends through a bore in the body 11 which forms the bearing 34, which bore of course communicates with the interior longitudinal bore 19. Consequently the oil seal 44 is provided to preclude oil flowing from said bore 19.

It is to be particularly noted, however, that the oil in bore 19 is not under high pressure but that this bore 19 communicates at all times with the drain port 57 by way of passageway 58, which drain port 57 is connected by pipe 81 to return pipe 82 leading to sump 70.

It is further to be noted that the high pressure line 77 from the accumulator 76 is delivered to the pressure port 53 and thence to recess 51. When this oil under high pressure is without influence insofar as any tendency to move the piston 48 is concerned because its action thereon is equalized by the pistons 48 and 148 which are of equal size and connected to opposite ends of the reduced portion 50. It is a matter of considerable practical importance that in the system herein disclosed which incorporates the valve 10, the pressure which is delivered to the pressure line 78 is determined entirely by the position of the hand lever 40, and it is entirely independent of the variations in pressure found in pipe 77 and pressure port 53. As a consequence, the valve 10 acts in a double capacity; that is, it acts as a pressure reducing valve and as a controlling valve, and eliminates entirely the necessity of any additional pressure reducing valve.

Furthermore, the pressure in the feed line 78 is always substantially constant after once being determined by the position of the handle 40. This is of considerable importance in case the wheels of the vehicle are eccentric as they most always invariably are and consequently cause a pulsating movement of the fluid in the line 78. In some previous known devices a hydraulic fluid is locked in the feed line such as the feed line 78, and this produces very uneven varying pressure as the eccentric wheels go round.

It is to be further understood that the valve 10 may be employed as an independent unit in any desired system solely as a reducing valve. In this connection it is only necessary to place the handle 40 in any desired position under which circumstances the valve 10 will act as a reducing valve and deliver a predetermined pressure to the bore 60 without respect to variations of the fluid pressure delivered to pressure port 53 with the single restriction that the former cannot be greater than the latter, which is true of any reducing valve. When the valve is used solely as a reducing valve it is of course manifest that the handle 40 might be eliminated together with the sleeve 30 and all connections between the two as well as the piston 22 and cylinder 26 together with all ports leading to the former and merely some abutment either fixed or adjustable provided to press against the spring 45 which would determine the pressure delivered to bore 60.

The features of invention herein disclosed in one respect constitute improvements on the invention disclosed in the application of Robert K. Jeffrey, Serial No. 288,387 for Hydraulic brake mechanism filed August 4, 1939, and it is to be understood that except for features which are distinctly indicated as differing from the disclosure of said application, the structure of the instant application is similar or identical.

In the operation of the system the pump 72 will be continuously operated and will maintain fluid under pressure in the pressure accumulator 76. The pressure of this fluid will of course vary between predetermined limits as determined by the mechanism of the accumulator 76 above described. This hydraulic fluid under variable pressure is delivered by pipe 77 to the combination reducing and control valve 10 and the pressure delivered by said control valve 10 to the feed line 78 of the braking system is determined by the position of lever 40 under the control of the operator. During normal operation of the vehicle the lever will be in the position illustrated in full lines in Figs. 1 and 6 which is the off position in which case the brakes will of course be released. To apply the brakes the operator merely moves the lever 40 to any desired position and the pressure delivered to the line 78 will be determined solely by the position of the lever 40 and independent of the pressure in line 77.

A preferred embodiment of the valve 10 as illustrated in Fig. 4, the lever 40 will be balanced to any position to which it is adjusted where it will of course remain even though the operator removes his hand from said lever 40. This condition exists for all positions up to a predetermined one which, in the illustration given, is 600 lbs., but of course this value may be determined at any desired value.

In case greater pressure is desired to be delivered to the line 78, the operator will be required to hold the lever 40 in its position to deliver said greater pressure and in case he releases said lever 40 it will automatically return to reduce the pressure in said line 78 to the predetermined maximum balanced line pressure.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A variable pressure fluid control valve comprising a body portion, a bored block and a fluid flow controlling piston therein, a pressure controlling spring in said body portion urging said piston toward valve opening position, an inlet pressure port leading to said piston and so constructed and arranged that the position of said piston is not influenced by the fluid under pressure in said inlet pressure port, means to adjust the pressure exerted by said spring on said piston, and equalizing means constructed and arranged to deliver fluid under pressure to equalize the forces on said adjusting means so it will remain in any position to which it is adjusted through the major portion of its travel and during another portion of which it is unequalized.

2. A variable pressure fluid control valve comprising a hollow body portion closed at one end by a bored block having a fluid flow controlling piston therein and the other end being closed by a piston supporting plate, a reciprocable sleeve in said body portion, a pressure controlling spring seated in said sleeve tending to urge said fluid flow controlling piston toward valve opening position, an inlet pressure port leading to said first mentioned piston and so constructed and arranged that the position of said fluid flow controlling piston is not influenced by the fluid under pressure in said inlet pressure port, means including said reciprocable sleeve to adjust the pressure exerted by said spring on said piston, and means cooperating with said sleeve to equalize the forces thereon during a portion of the adjustable travel and to remove said equalizing effect during another portion thereof.

3. A variable pressure fluid control valve of the piston type, comprising a combination control and pressure reducing valve, adjusting means for varying the pressure emitting from said valve, and means constructed and arranged to deliver fluid under pressure to equalize the forces on said adjusting means so it will remain in any position to which it is adjusted through the major portion of its travel and during another portion of which said equalizing forces are negated.

4. A variable pressure fluid control valve comprising a manually adjustable member, means operating in response to adjustment of said member to any predetermined position to deliver a predetermined fluid pressure, and means for balancing the forces on said adjustable member in any position to which it is adjusted within one range and not to balance said forces thereon within another range wherein it is influenced to return to the first range.

5. A variable pressure fluid control valve comprising a manually adjustable member, and means for balancing the forces on said adjustable member in any position to which it is adjusted within one range and not to balance said forces thereon within another range wherein it is influenced to return to the first range.

6. A variable pressure fluid control valve comprising the combination with a body portion, of valve mechanism comprising a fluid flow controlling piston, a pressure controlling spring in said body portion acting on said piston to urge the same to open position to connect a supply port to a feed port, manually actuated mechanism for adjusting the tension in said spring and thereby adjust the pressure exerted by said spring on said piston, a piston fixed to one end of said body portion and having a passageway extending longitudinally through the same, said passageway being in communication with said feed port, a floating balancing cylinder slidable along said fixed piston and closed at its inner end, and a peripheral flange on said balancing cylinder in position to engage a part of said manually actuated mechanism to hold the latter by fluid pressure in the position to which manually adjusted.

7. A variable pressure fluid control valve comprising a hollow body portion, a valve block at one end thereof, a piston valve in said valve block, a closure for the other end of said body portion, a reciprocable sleeve in said body portion, a pressure controlling spring seated in said sleeve tending to urge said piston valve to opening position, means including said reciprocable sleeve to adjust the pressure exerted by said spring on said piston valve, a piston carried by said closure, a floating balancing cylinder slidable along said piston, a peripheral flange on said balancing cylinder in position to engage one end of said sleeve, and means affording ports and passageways for connecting one end of said piston valve to the interior of said balancing cylinder to secure equalization of forces on said sleeve.

8. A combination control and pressure reducing valve, comprising the combination with valve mechanism for controlling the flow of fluid pressure medium from a supply pressure port to a feed port, of a spring connected to said valve mechanism, an adjustable device movable toward and from said valve mechanism, a floating balancing cylinder, a stationary piston along which said floating balancing cylinder is slidable, a peripheral flange on said cylinder in position to be moved into engagement with said adjustable device, and means affording passageways from said feed port to said valve mechanism and through said piston to said cylinder to effect movement of the latter into such position that said peripheral flange shall engage said adjustable device.

9. A combination control and pressure reducing valve, comprising the combination with valve mechanism for controlling the connection between a pressure supply port and a feed port, of a spring connected to said valve mechanism, a sleeve surrounding a portion of said spring and connected to one end of the latter, a guide for said sleeve, mechanism for moving said sleeve along said guide to compress said spring to cause the latter to open said valve mechanism, a piston secured to said guide, a balancing cylinder closed at its inner end and slidable along said piston, a peripheral flange on the open end of said cylinder in position to engage one end of said sleeve, and means establishing communication between said feed port and said valve mechanism and between the feed port and a passageway through said piston to the interior of said cylinder to effect a balancing of forces exerted on said sleeve to hold the same in adjusted position when the valve mechanism is closed and pressure medium is locked in said feed port.

10. A combination control and pressure reducing valve, comprising the combination with a hollow body portion closed by a plate at one end and by a valve port block at the other end, of a piston valve movable in the port block, a guide piston fixed to said plate, a balancing cylinder slidable along said fixed piston and closed at its inner end, a sleeve guided along the inner surface of said hollow body portion, a spring connecting said sleeve and said piston valve, mechanism for actuating said sleeve to compress said spring and thereby effect opening of a supply pressure port to a feed port in the valve port block, a radial extension from said balancing cylinder to the inner wall of said hollow body portion, an abutment on such inner wall spaced inwardly from said plate to limit the inward movement of said cylinder when said extension engages such abutment, and means establishing fluid pressure equalizing connections extending through said fixed piston to said cylinder, the construction and arrangement being such that varying pressures may be locked in the feed port as predetermined by the setting of the said sleeve until said radial extension engages said abutment after which increased pressure may be produced in said feed port by moving said sleeve beyond said abutment.

11. A variable pressure fluid control valve comprising a cylindrical casing, a valve port block closing one end of said casing, spaced-apart pistons of equal diameter with a connection between them of reduced diameter associated with the supply pressure port in said block, said pistons being movable in said block to connect said supply pressure port to a feed port, fluid pressure responsive actuating means in said casing at that end thereof remote from said valve port block, a spring between said fluid pressure responsive actuating means and one end of the piston remote from said supply pressure port to establish counterbalancing pressures between said fluid pressure responsive actuating means and said pistons and thereby equalize the forces exerted on the ends of said spring, and means comprising an abutment fixed to said casing in position to limit the extent of compression of said spring by operation of said fluid pressure responsive actuating means.

12. A variable pressure fluid control valve comprising a casing, a valve port block closing one end of said casing, spaced-apart pistons of equal diameter with a connection between them of reduced diameter and always in communication with the supply port, said pistons being movable in said block to connect a supply pressure port to a feed port and the latter being always in communication with one end of one of said pistons remote from the connection between the same so that the fluid pressure in the feed port will always be exerted on the said piston end tending to move the pistons to supply port closing position, manually operable variable pressure means for acting on said pistons to move the same to opening position to connect the supply port to said feed port, and fluid pressure responsive means always connected to said feed port as well as said piston end and adapted to act on said manually operable means to serve as fluid pressure equalizing means to hold the pistons in closing position with the liquid locked in said feed port at a pressure predetermined by the setting of said manually operable means.

STERLING C. MOON.